United States Patent
Spence et al.

(10) Patent No.: US 9,660,306 B2
(45) Date of Patent: May 23, 2017

(54) SYSTEMS AND METHODS FOR SELECTIVELY SEPARATING AND SEPARATELY PROCESSING PORTIONS OF LEAD-ACID BATTERIES

(71) Applicant: Johnson Controls Technology Company, Holland, MI (US)

(72) Inventors: Matthew A. Spence, Lindenhurst, IL (US); Patrick M. Curran, Laguna Niguel, CA (US); Eberhard Meissner, Wunstorf (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 154 days.

(21) Appl. No.: 14/586,005

(22) Filed: Dec. 30, 2014

(65) Prior Publication Data
US 2016/0079636 A1 Mar. 17, 2016

Related U.S. Application Data

(60) Provisional application No. 62/049,823, filed on Sep. 12, 2014.

(51) Int. Cl.
*H01M 10/54* (2006.01)
*C22B 1/00* (2006.01)
(Continued)

(52) U.S. Cl.
CPC ............ *H01M 10/54* (2013.01); *C22B 1/005* (2013.01); *C22B 13/025* (2013.01);
(Continued)

(58) Field of Classification Search
CPC ..... H01M 10/54; C22B 13/025; C22B 13/045
See application file for complete search history.

(56) References Cited

U.S. PATENT DOCUMENTS 2,398,275 A    4/1946    Alpert
4,098,658 A    7/1978    Ginatta
(Continued)

FOREIGN PATENT DOCUMENTS

CN    103928727    7/2014
DE    4419461    12/1995
EP    0795919    9/1997

OTHER PUBLICATIONS

PCT/US2015/041430 International Search Report and Written Opinion dated Nov. 5, 2015.

*Primary Examiner* — Jonathan Jelsma
(74) *Attorney, Agent, or Firm* — Fletcher Yoder, P.C.

(57) ABSTRACT

The present disclosure relates generally to systems and methods for recycling lead-acid batteries, and more specifically, relates to systems and methods for selectively separating and separately processing portions of lead-acid batteries to improve efficiency and reduce costs. A lead-acid battery processing system includes an imaging system configured to perform imaging of a lead-acid battery and perform image analysis to determine a break point that divides top lead from a remainder of the lead content of the lead-acid battery. The system also includes a battery breaking device configured to break the lead-acid battery at the determined break point and separate the lead-acid battery into a first portion, which includes the top lead, from a second portion, which includes the remainder of the lead content, for separate processing of the first and second portions of the lead-acid battery.

27 Claims, 6 Drawing Sheets

(51) Int. Cl.
*C22B 13/02* (2006.01)
*C22B 3/00* (2006.01)
*H01M 10/06* (2006.01)

(52) U.S. Cl.
CPC ........... *C22B 13/045* (2013.01); *H01M 10/06* (2013.01); *Y02W 30/84* (2015.05)

(56) References Cited

U.S. PATENT DOCUMENTS

| | | | |
|---|---|---|---|
| 4,460,442 A * | 7/1984 | Ducati | C22B 13/045 205/599 |
| 4,501,943 A * | 2/1985 | Lund | B23K 13/00 219/603 |
| 5,280,858 A * | 1/1994 | Keri | H01M 4/16 241/23 |
| 5,707,015 A | 1/1998 | Guthrie | |
| 5,788,739 A * | 8/1998 | Margulis | C22B 13/025 423/621 |
| 6,520,018 B1 * | 2/2003 | Flores-Lira | G01N 29/11 73/629 |
| 8,615,864 B2 | 12/2013 | Mizusawa | |
| 2007/0054177 A1 | 3/2007 | Yamashita et al. | |
| 2007/0077497 A1 | 4/2007 | Funato et al. | |
| 2009/0171600 A1 | 7/2009 | Machiyama | |
| 2009/0269658 A1 | 10/2009 | Shukla et al. | |
| 2009/0317696 A1 | 12/2009 | Chang | |
| 2010/0009263 A1 | 1/2010 | Gerber | |
| 2010/0146761 A1 | 6/2010 | Sloop | |
| 2011/0300434 A1 | 12/2011 | Harada et al. | |
| 2013/0055553 A1 | 3/2013 | Zhang | |
| 2014/0087218 A1 | 3/2014 | Saito | |

* cited by examiner

SYSTEMS AND METHODS FOR SELECTIVELY SEPARATING AND SEPARATELY PROCESSING PORTIONS OF LEAD-ACID BATTERIES

CROSS-REFERENCE

This application claims priority from and the benefit of U.S. Provisional Application Ser. No. 62/049,823, entitled "SELECTIVE DISASSEMBLY OF SPENT LEAD ACID BATTERY CORES," filed Sep. 12, 2014, which is hereby incorporated by reference in its entirety for all purposes.

BACKGROUND

The present disclosure relates generally to systems and methods for recycling spent lead-acid batteries, and more specifically, relates to systems and methods for selectively separating and separately processing portions of spent lead-acid batteries to improve efficiency and reduce costs.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A spent lead-acid battery, as used herein, refers to a lead-acid battery that is at the end of its useable service life. For other lead-acid battery recycling methods, a spent lead-acid battery may processed by a hammer mill or similar device that grinds the entire spent lead-acid battery into a mixture of particulates that are subsequently pyrometallurgically processed to recover the lead content of the battery for reuse. Such methods fail to take advantage of how the various recyclable materials are arranged in the spent lead-acid battery before processing begins, and it is presently recognized that this failure introduces additional cost and complexity for such recycling processes. Additionally, such methods also have difficulty dealing with certain types of lead-acid batteries, such as absorbent glass mat (AGM) batteries, whose silica content can damage or degrade furnaces used in pyrometallurgical processing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a spent lead-acid battery processing system includes an imaging system configured to perform imaging of a spent lead-acid battery and perform image analysis to determine a break point that divides top lead from a remainder of the lead content of the spent lead-acid battery. The system also includes a battery breaking device configured to break the spent lead-acid battery at the determined break point and separate the spent lead-acid battery into a first portion, which includes the top lead, from a second portion, which includes the remainder of the lead content, for separate processing of the first and second portions of the spent lead-acid battery.

In an embodiment, a method for selectively breaking and separately processing portions of a lead-acid battery includes determining, using a battery imaging system, a break point that divides top lead from a remainder of the lead content of the spent lead-acid battery. The method includes breaking the spent lead-acid battery at the determined break point using a battery breaking device and separating the spent lead-acid battery into a first portion, which includes the top lead, and a second portion, which includes the remainder of the lead content of the spent lead-acid battery.

In an embodiment, a spent lead-acid battery processing system includes a controller having a memory and a processor configured to execute instructions stored in the memory to control operation of the spent lead-acid battery processing system. The system includes an imaging system that images a spent lead-acid battery and provides the processor with image data, wherein the processor analyzes the image data to determine a break point that divides top lead of the spent lead-acid battery from a remainder of the lead content of the spent lead-acid battery. The system includes a battery breaking device that breaks the spent lead-acid battery at the break point based on control signals provided by the processor of the control system and separates the spent lead-acid battery into a first portion, which includes the top lead, from a second portion, which includes the remainder of the lead content of the spent lead-acid battery. The system also includes a remelting device that remelts the top lead from the first portion based on control signals provided by the processor of the controller, wherein the remelt yields a lead alloy that has similar alloying metal composition as the top lead and is suitable for use in new lead-acid batteries. The system also includes a pyrometallurgical or hydrometallurgical lead recovery system that receives and converts the remainder of the lead content of lead acid battery to metallic lead, lead oxide, or a combination thereof, suitable for use in new lead-acid batteries.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the unmodified term "lead", should be interpreted to encompass all forms of lead, including metallic lead, lead alloys, lead compounds, and mixtures thereof. For distinction, metallic lead (i.e., Pb(0)) may be referred to herein using the terms elemental lead, metallic lead, or free lead. A "lead alloy" as used herein refers to a material that includes metallic lead in addition to one or more other alloying metals (e.g., antimony, arsenic, selenium, calcium, tin, silver, cadmium). "New lead-acid battery" herein refers to a newly produced lead-acid battery, while the term "spent lead-acid battery" indicates a battery at the end of its useable service life.

Figure 1:
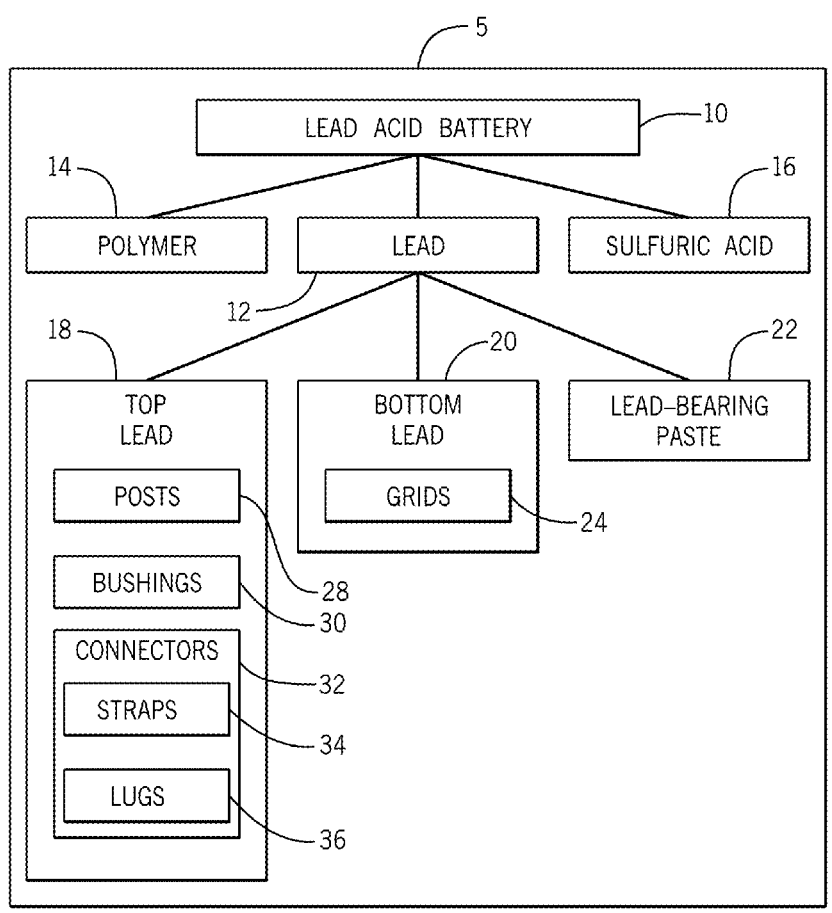
FIG. 1 is a diagram illustrating various components of a spent lead-acid battery as it pertains to a lead-acid battery recycling system, in accordance with embodiments of the present approach.

FIG. 1 is a schematic that illustrates an example embodiment of a lead-acid battery recycling system 5 in the process of recycling a lead-acid battery 10 (e.g., a spent lead acid battery 10). As illustrated in FIG. 1, with respect to the disclosed lead-acid battery recycling system 5, the recyclable materials of the lead-acid battery 10 may be divided into three main categories. These categories include: lead content 12 (e.g., metallic lead, lead alloys, lead oxides, lead sulfate), polymer content 14 (e.g., used for separators and the enclosure), and sulfuric acid content 16 (e.g., dilute sulfuric acid). It should be appreciated that these categories are not exhaustive, and that other categories of battery components (e.g., metallic enclosure, carbon black, glass mats, silica gels, non-lead metals) may be present in the lead-acid battery 10 without negating the effect of the present approach. The disclosed lead-acid battery processing system and method embodiments discussed below enable an efficient recovery of the lead content 12, polymer content 14, and sulfuric acid content 16 from lead-acid batteries 10 for reuse in the construction of new lead-acid batteries.

For the purposes of this disclosure, the lead content 12 of the lead-acid battery 10 may be further divided into subcategories. As illustrated in FIG. 1, these categories may include top lead 18, bottom lead 20, and lead-bearing paste 22. The term "bottom lead" herein refers to metallic lead (e.g., pure metallic lead and/or lead alloy) of the lead-acid battery 10 that is primarily for structural support of the active material and electrical conduction to and from this active material. For example, the bottom lead 20 of the lead-acid battery 10 may include a number of grids 24, sheets, spines, or plates made of pure metallic lead or lead alloy. In general, for certain lead-acid batteries 10, the bottom lead 20 may have fewer and/or lower quantities of alloying metals (e.g., antimony, arsenic, selenium, calcium, tin, silver, cadmium) than the top lead 18, which is discussed below.

The term "lead-bearing paste" herein refers to the battery paste of the lead-acid battery 10, which includes a number of different lead compounds (e.g., lead dioxide, lead sulfate, porous metallic lead). The lead-bearing paste 22 is involved in the electrochemistry of the battery 10 during operation. For example, a lead-acid battery 10 may include grids 24 of bottom lead 20 coated with lead-bearing paste 22 and disposed within the sulfuric acid 16. For a battery at the end of useful service life, a significant portion of the metallic bottom lead 20 may be converted to lead compounds, leading to failure of the mechanical support of the lead bearing paste 22, and the loss of conductive paths between electrochemically active materials and the terminals. Furthermore, in a lead-acid battery 10, the bond between the lead bearing paste 22 and the bottom lead 20 may be structurally degraded to the point that a sludge containing lead compounds, sulfuric acid and metallic lead pieces results. When electrode eventually breaks down, the battery can no longer supply power and is considered spent.

The top lead 18 of the lead-acid battery 10 is not directly involved in the electrochemistry of the lead-acid battery during its operational life. As used herein, "top lead" refers to metallic lead (e.g., pure metallic lead or lead alloys) that generally provides conductive paths for electrical current to flow. As such, the top lead 18 is not electrochemically converted during charging and discharging cycles of the lead-acid battery. In general, portions of the top lead 18 may have a greater number and/or amount of alloying metals (e.g., antimony, arsenic, selenium, calcium, tin, silver, cadmium) relative to the bottom lead 20 in order to provide material properties (e.g., hardness, toughness) that are better suited for the functions that the top lead 18 provides for the lead-acid battery. As illustrated in FIG. 1, for certain lead-acid batteries 10, the top lead 18 may include terminal posts 28, as well as the bushings 30 that are disposed around the terminal posts 28. It may be appreciated that, especially the terminal posts 28 and/or bushings 30, in particular, may be made of a lead alloy (e.g., a lead antimony alloy) that is harder than pure metallic lead to limit wear to the terminal posts 28 as connectors are repeatedly attached and removed from the terminal posts 28.

Figure 3:
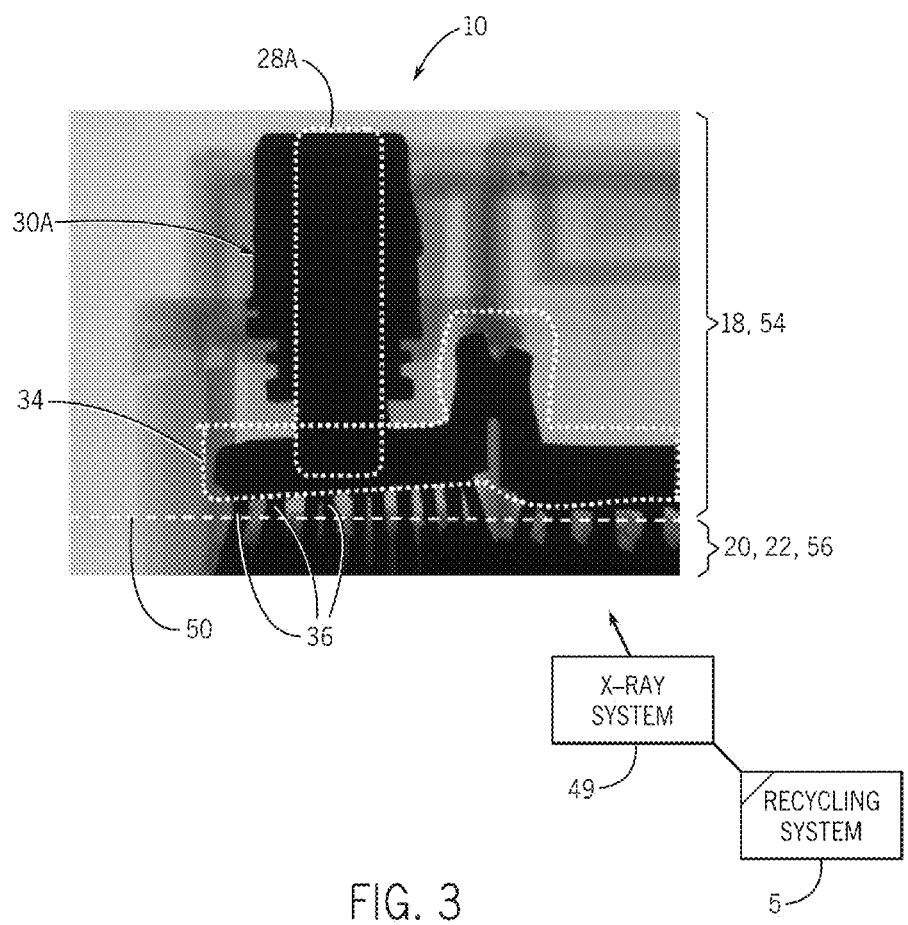
FIG. 3 is an X-ray view of the negative terminal the spent lead-acid battery of FIG. 2, in accordance with embodiments of the present approach.
Figure 4:
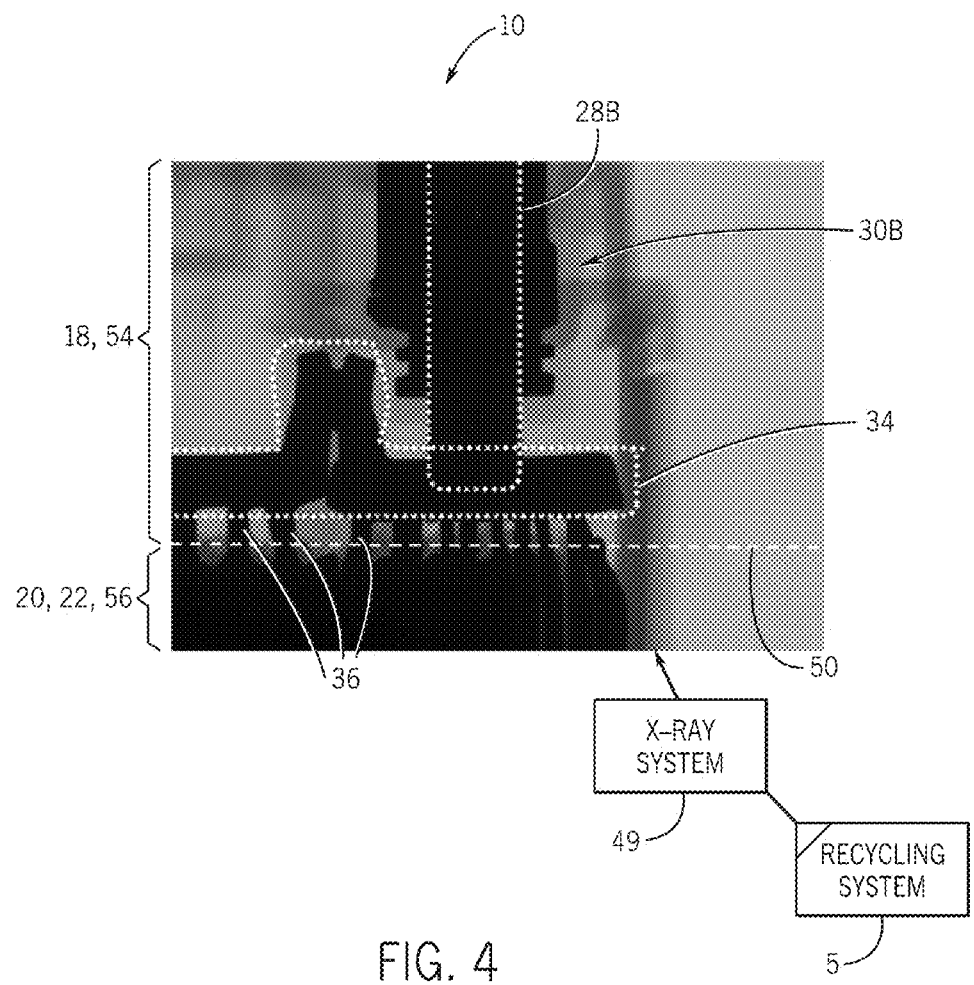
FIG. 4 is an X-ray view of the positive terminal the spent lead-acid battery of FIG. 2, in accordance with embodiments of the present approach.

Additionally, the top lead 18 may include connectors 32, a term that generally refers to portions of the top lead 18 that electrically connect the grids 24 of bottom lead 20 to the terminal posts 28. In particular, the top lead connectors 32 may include cast-on straps (COS) 34, referred to hereinafter as straps 34, in which the lugs 36 are coupled (e.g., welded) in order to electrically connect the lugs 36 of the grids 24 to the terminal posts 28. For a typical lead-acid battery 10, the straps 34 alone may represent approximately 10% of the total lead content 12 of the lead-acid battery 10. For certain lead-acid batteries 10, the top lead 18 may also include at least a portion of the lugs 36 themselves, which are portions of the grids 24 that extend away from the remainder of the grids 24 to reach, and electrically couple, the grids 24 to the straps 34 of the lead-acid battery. As such, it may be appreciated that, while the lugs 36 may be formed as part of the grids 24, in certain embodiments, at least a portion of the lugs 36 may be processed as top lead 18 by the battery recycling system 5. In other embodiments, the battery recycling system 5 may process the posts 28, the bushings 30, and the straps 34, and little or none of the lugs 30 as top lead 18. The terminal posts 28, the bushings 30, and the connectors 32 are illustrated in FIGS. 3 and 4, which are discussed in detail below.

As discussed below, present embodiments are directed toward systems and methods for selectively breaking the lead-acid battery 10 and then separately processing the resulting portions of the lead-acid battery 10. The disclosed systems and methods take advantage of how the lead 12, the polymer 14, and the sulfuric acid 16 of the lead-acid battery 10 are arranged within the lead-acid battery 10 before processing begins in order to improve the efficiency of the recovery process. This enables the disclosed systems and methods, for example, to process and recover the top lead 18 separately from the bottom lead 20 and lead-bearing paste 22 of the lead-acid battery 10. Accordingly, the recovered top lead 18, as presently disclosed, may be ready for use in the manufacture of a new lead-acid battery after remelting, which reduces cost and time by avoiding unnecessary pyrometallurgical or hydrometallurgical purification of the top lead 18. Furthermore, using the disclosed technique, the alloying metals (e.g., antimony, arsenic, selenium, calcium, tin, silver, cadmium) are not substantially removed from the top lead 18 during remelting. For other lead-acid battery processing systems and methods, the entire lead content 12 of the lead-acid battery 10 undergoes pyrometallurgical or hydrometallurgical purification, which introduces significant costs associated with replacing alloying metals before the recovered lead can be used to make terminal posts 28, bushings 30, and straps 34 for the construction of a new lead-acid battery. Additionally, the presently disclosed systems and methods enable the specialized processing of certain types of lead-acid batteries 10 (e.g., AGM batteries) may be difficult to process in batches using traditional pyrometallurgical processing techniques.

Figure 2:
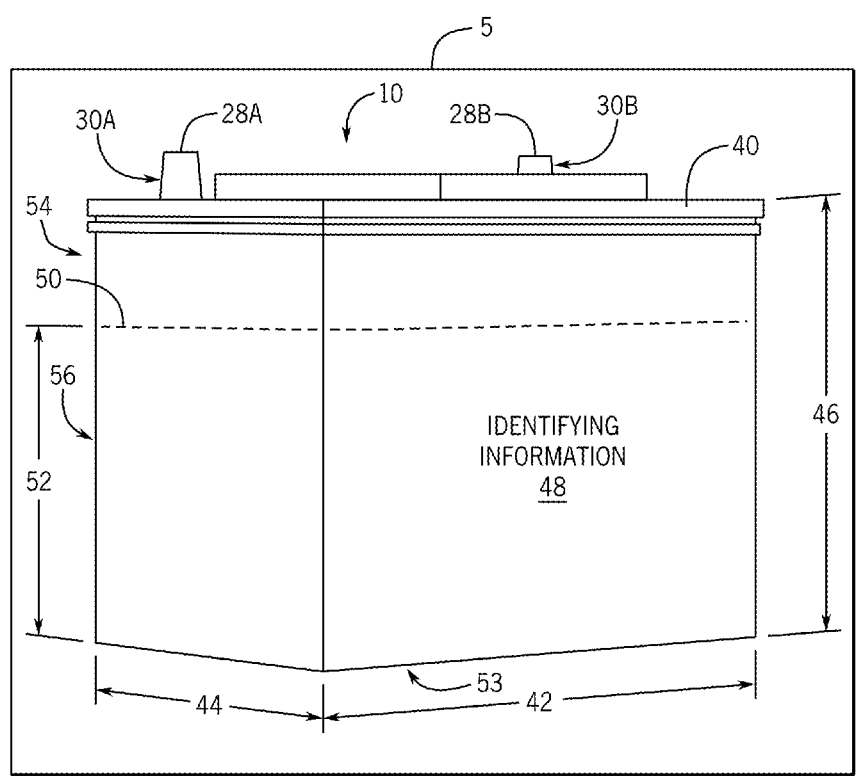
FIG. 2 is a perspective view of a spent lead-acid battery within a lead-acid battery recycling system, in accordance with embodiments of the present approach.

FIG. 2 is a schematic illustrating an example of a lead-acid battery 10 in the process of being recycled by the battery recycling system 5 in accordance with the disclosed systems and methods. The illustrated battery 10 includes a polymer enclosure 40 that is generally a rectangular prism. As such, the enclosure 40 of the illustrated lead-acid battery 10 has a particular length 42, a particular width 44, and a particular height 46. Additionally, the illustrated enclosure 40 includes identifying information 48 (e.g., barcodes, quick response (QR) codes, text, colors, logos, symbols) indicating the brand, manufacturer, model, and version, or other information that may be used to identify the lead-acid battery 10. For the lead-acid battery 10 illustrated in FIG. 2, the only portion of the lead content 12 visible from the outside of the opaque polymer enclosure 40 is the negative and positive terminal posts 28A, 28B and the bushings 30A, 30B, which represent only a portion of the top lead 18 of the lead-acid battery 10. Other portions of the top lead 18, including the bottom portion of the terminals 28A and 28B and the strap 32, are not visible through the opaque polymer enclosure 40.

When the lead-acid battery 10 illustrated in FIG. 2 is imaged using an X-ray imaging system 49 of the recycling system 5, then other portions of the lead content 12 may be visualized. It should be appreciated that X-ray imaging is discussed herein as an example, and in other embodiments, other imaging methods may be used that rely on penetrating radiation (e.g., X-rays, gamma rays, beta radiation) and a penetrating radiation detector to probe the internal structure of the lead-acid battery 10. With this in mind, FIG. 3 is an X-ray image of a portion of the lead-acid battery 10 near the negative terminal post 28A, while FIG. 4 is an X-ray image of a portion of the lead-acid battery 10 near the positive terminal post 28B. In FIG. 3, bushing 30A encircles the negative terminal post 28A, and the straps 34 are coupled (e.g., welded) to the bottom of the negative terminal post 28A. Similarly, in FIG. 4, bushing 30B encircles the positive terminal post 28B, and the straps 34 are coupled (e.g., welded) to the bottom of the positive terminal post 28B. In FIGS. 3 and 4, the bottom lead 20 and the lead-bearing paste 22 of the lead-acid battery 10 are not clearly defined, but rather are generally indicated by the dark region near the bottom of the figures. However, in FIGS. 3 and 4 the lugs 36 of the grids 24 are visible and appear as finger-like appendages that extend up from the grids 24 and are coupled (e.g., welded, cast) to the straps 34.

It may be appreciated that, for the lead-acid battery 10 illustrated in FIGS. 3 and 4, the portion of the lead content 12 disposed above the dashed line 50 is top lead 18, while the portion of the lead content 12 disposed below the dashed line 50 is bottom lead 20 and lead-bearing paste 22. As such, one aspect of the present approach is selectively breaking the lead-acid battery 10 along the dashed line 50 (referred to hereafter as the break point 50) such that the top lead 18 may be separated from the bottom lead 20 and the lead-bearing paste 22 before further processing. It should be appreciated that, for other lead-acid batteries having different arrangements, the break point 50 may be otherwise positioned (e.g., at different heights, vertically, at offset angles) such that the break point 50 is positioned to traverse at or near the lugs 36 (e.g., below the straps 34) of the lead-acid battery 10. In general, the break point 50 may be selected such that it divides the lead-acid battery 10 into two pieces (e.g., the upper portion 54 and the lower portion 56), wherein one of the pieces includes mostly or entirely top lead 18.

Turning once more to FIG. 2, the example break point 50 is illustrated as a horizontal break point 50 disposed at a particular height 52 relative to the base 53 of the enclosure 40 of the lead-acid battery 10. Accordingly, for the example lead-acid battery 10 illustrated in FIG. 2, breaking the lead-acid battery 10 at the illustrated break point 50 splits the battery 10 into an upper portion 54 and a lower portion 56. As illustrated in FIGS. 3 and 4, and discussed above, the break point 50 generally divides the top lead 18 from the bottom lead 20 and lead-bearing paste 22 at or near the lugs 36. For example, in certain embodiments, the break point 50 may be positioned below the straps 34 and above the tops of the grids 22 of the lead-acid battery 10. More specifically, in certain embodiments, the break point 50 may be positioned at the point where the lugs 36 meet the tops of the grids 22, such that a substantial portion of the lugs 36 may be recovered with the top lead 18. In certain embodiments, the break point 50 may be positioned slightly higher or lower (e.g., ±5 mm) so that more or less of the lugs 36 are separated into the upper portion 54. Additionally, the break point 50 may be positioned such that the upper portion 54 of the battery 10 includes little (i.e., less than 10%, less than 5%, less than 1%) or no lead-bearing paste 22. Accordingly, in terms of the lead content 12, the upper portion 54 of the lead-acid battery 10 includes substantially or entirely top lead 18, while the lower portion 56 includes substantially or entirely the bottom lead 20, the lead-bearing paste 22, and the sulfuric acid 16. As illustrated in FIG. 2, both the upper portion 54 and the lower portion 56 include some of the polymer content 14 (e.g., from the enclosure 40) of the lead-acid battery 10.

Figure 5:
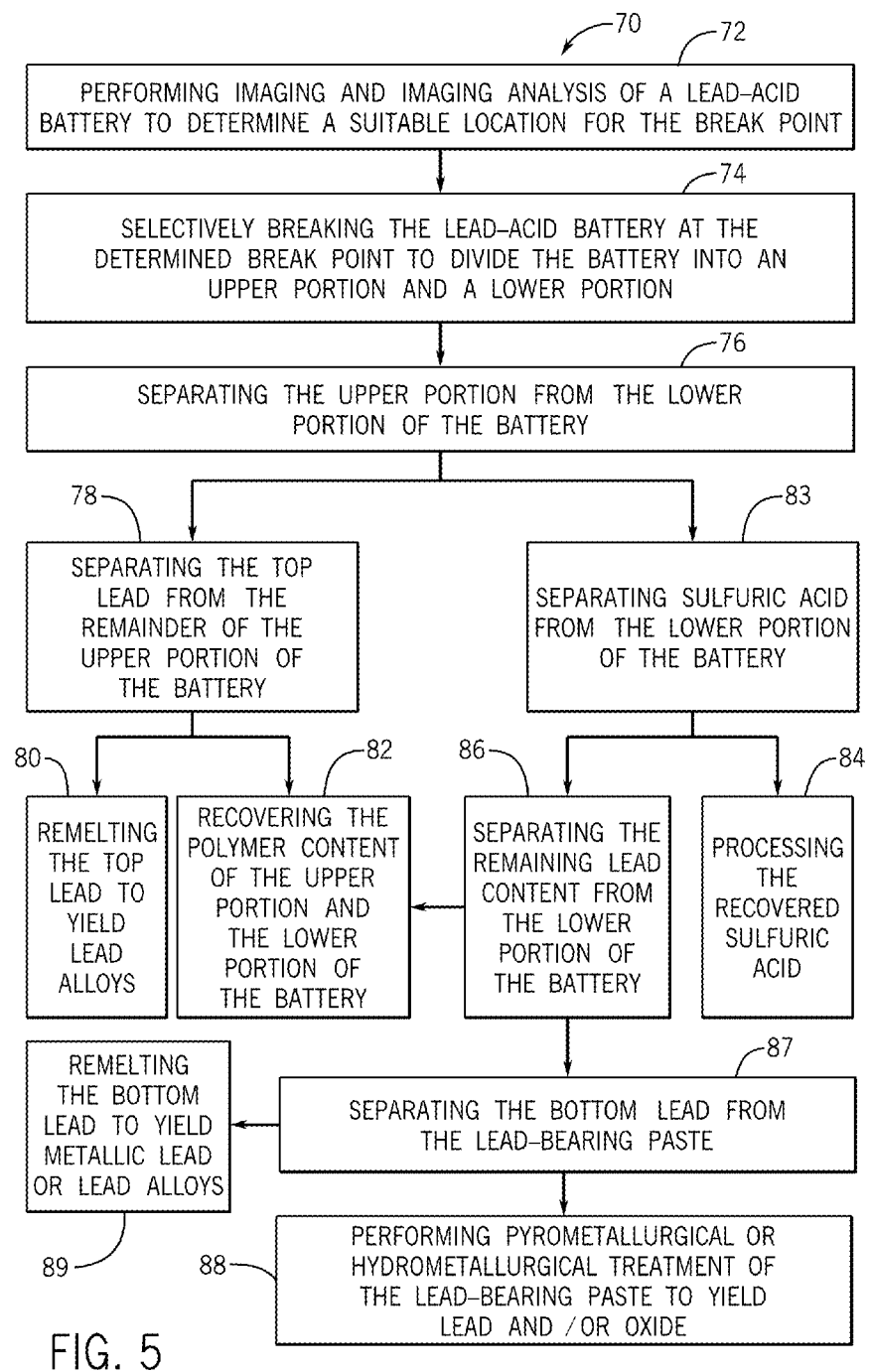
FIG. 5 is a process for recovering and reusing the top lead from a spent lead-acid battery, in accordance with embodiments of the present approach.

With the foregoing in mind, one aspect of the present approach is the selective removal and processing of the top lead 18 of the lead-acid battery 10 separately from the remainder of the lead content 12 (i.e., bottom lead 20 and lead-bearing paste 22). FIG. 5 illustrates an embodiment of a process 70 for selectively breaking the lead-acid battery 10 and separately processing the top lead 18. It may be appreciated that the process 70 illustrated in FIG. 5 may be implemented using devices and systems of the example battery recycling system 90 discussed below, with respect to FIG. 6. The process 70 illustrated in FIG. 5 begins with performing (block 72) imaging of the lead-acid battery 10, as well as performing imaging analysis, to determine a suitable break point 50 for the model and version of the battery 10. As illustrated in FIG. 2, the opaque enclosure 40 does not allow for an optical or visual determination of the position of the lugs 36 to select an appropriate height 52 for the break point 50.

As such, in certain embodiments, the imaging and image analysis of block 72 in FIG. 5, may involve optical imaging (e.g., cameras or other suitable visual inspection systems) and optical imaging analysis using a battery imaging system. The battery imaging system may determine whether the model and version of the lead-acid battery 10 is already present in a data repository, such as a database or library that is communicatively coupled to or part of the battery imaging system. This data repository may be populated with suitable break point locations 50 for particular models and versions of lead-acid batteries 10 based on previous X-ray imaging and X-ray image analysis (as described above with respect to FIGS. 3 and 4), or based on battery design data. Further, these break point locations 50 may be stored in the data repository along with key identifying characteristics for particular models and versions of lead-acid batteries 10 (e.g., identifying information 48, the dimensions of the enclosure 40 of the lead-acid battery 10, the shape of the enclosure 40 of the lead-acid battery 10, or a combination thereof).

Accordingly, in certain embodiments, if the particular model and version of the lead-acid battery 10 cannot be located in the data repository, then the imaging and analysis of block 72 in FIG. 5 may involve using an X-ray imaging system to acquire X-ray images of the lead-acid battery 10, as are illustrated in FIGS. 3 and 4. Subsequently, these X-ray images may be analyzed (e.g., manually or automatically by a processor of the battery processing system) to determine the positions of the lugs 36 and a suitable position (e.g., a suitable height 52) for the break point 50, as illustrated in FIGS. 2-4. Further, in certain embodiments, data related to the determined break point 50 may be stored in the data repository, along with the aforementioned identifying characteristics for the model and version of the lead-acid battery 10, to speed future processing by avoiding repetition of an X-ray imaging step for previously analyzed battery models and versions. In still other embodiments, a penetrating radiation (e.g., X-ray, gamma ray, beta radiation) detector may measure the density of the internal structure of the battery cell relative to the height 46 of the battery cell 10 (e.g., based on transmission or reflection of the penetrating radiation) instead of obtaining a full image of the internal structure of the lead-acid battery 10 to determine a suitable break point 50.

Continuing through the method 70 illustrated in FIG. 5, next the lead-acid battery 10 may be selectively broken (block 74) at the determined break point 50 to divide the lead-acid battery 10 into an upper portion 54 and a lower portion 56. In certain embodiments, the lead-acid battery 10 may be broken at the determined break point 50 using a bandsaw, a guillotine, or another suitable cutting or breaking device that is generally capable of breaking through the entire lead-acid battery 10 (e.g., the entire length 42 and width 44 of the lead-acid battery 10) to divide the lead-acid battery 10 into two portions.

Subsequently, the upper portion 54 may be separated (block 76) from the lower portion 56 of the lead-acid battery 10 so that they may each be processed separately, as discussed in greater detail below. The upper portion 54 of the lead-acid battery 10 generally includes both polymer content 12 (e.g., from the enclosure 40) and top lead 18. The bottom portion 56 includes the remainder of the lead-acid battery, which may include bottom lead (e.g., from the grids 24), polymer content 12 (e.g., from the enclosure 40 and possibly from separators disposed between the grids 24), lead-bearing paste 22, sulfuric acid 16, and possibly other content (e.g., silica, sludge, salts, etc.).

As illustrated in FIG. 5, the upper portion 54 of the lead-acid battery 10 may then be processed to separate (block 78) the top lead 18 from the remainder of the upper portion 54 of the lead-acid battery 10. For example, the upper portion 54 of the lead-acid battery 10 may be provided to a hammer mill or another suitable grinding device capable of breaking the upper portion 54 into small pieces or particles. Subsequently, as part of the step represented by block 78, the particles of polymer 14 may be separated from the particles of top lead 18 using, for example, a sedimentation system, centrifuge separation device, or cyclone separator that takes advantage of the difference between the densities of the polymer particles and the lead particles.

Continuing through the method 70 illustrated in FIG. 5, the top lead 18 separated in block 78 may then be remelted (block 80) to yield lead alloys that may be used in the construction of a new lead-acid battery. Unlike pyrometallurgical or hydrometallurgical purification, remelting involves heating the recovered top lead 18 to its melting point, removing impurities from the surface of the molten metal, and possibly adding additional alloying metals, to yield a lead alloy suitable for use as top lead 18 in a new lead-acid battery. It may be appreciated that remelting does not remove a substantial portion of the alloying metals from the top lead 18, nor does it involve the additional time and cost associated with pyrometallurgical or hydrometallurgical purification. As such, in certain embodiments, the top lead 18 recovered from a lead-acid battery 10 may be used to construct the top lead components (e.g., the terminal posts 28, the bushings 30, the straps 34) and/or the bottom lead components (e.g., the grids 24) of a new lead-acid battery without undergoing substantial purification.

For the process 70 illustrated in FIG. 5, the lower portion of the lead-acid battery 10 separated in block 76 may subsequently be processed to separate (block 83) the sulfuric acid content 16 from the remainder of the lower portion battery 10. For example, the separated lower portion of the lead-acid battery 10 may be leaned or tilted to pour out the dilute sulfuric acid content 16 contained within. The recovered dilute sulfuric acid may subsequently be processed (block 84) to remove impurities and to adjust the pH of the recovered sulfuric acid such that it is suitable for use in the manufacture of new lead-acid batteries. In certain embodiments, the actions represented by blocks 76 and 83 may be achieved simultaneously by positioning the lead-acid battery 10 on a side or end portion and breaking the lead-acid battery 10 vertically along the break point 50. For such embodiments, after breaking the lead-acid battery 10, the liquid sulfuric acid 16 may flow out from the broken lead-acid battery 10 under gravity, and then the upper portion 54 and the lower portion 56 of the lead-acid battery 10 may be processed as described herein.

For the process 70 illustrated in FIG. 5, after the sulfuric acid content 16 has been removed in block 83, the lower portion 56 of the lead-acid battery 10 may be further processed to separate (block 86) the remaining lead content (i.e., the bottom lead 20 and the lead-bearing paste 22) from the rest of the lower portion 56 of the battery 10. For example, the lower portion 56 of the lead-acid battery 10 may be provided to a hammer mill or another suitable grinding device capable of breaking the lower portion 56 into small pieces or particles. Subsequently, as part of the step represented by block 86, the particles of polymer 14 may be separated from the particles of bottom lead 20 using, for example, a sedimentation system, a centrifuge separation device or cyclone separator that takes advantage of the difference between the densities of the polymer particles and the lead particles.

As illustrated in FIG. 5, the polymer content 14 separated from the upper portion 54 of the lead-acid battery 10 in block 78, as well as the polymer content 14 separated from the lower portion 56 of the lead-acid battery 10 in block 86, may be processed to recover (block 82) the polymer content 14 of the lead-acid battery 10. Furthermore, the remainder of the lead content of the battery 10 may be separated (block 87) into bottom lead 20 (e.g., metallic lead from grids 24) and lead-bearing paste 22. The lead-bearing paste 22 may then be processed using pyrometallurgical or hydrometallurgical techniques to yield lead and/or lead oxide that is suitable for the manufacture of battery paste for new lead-acid batteries. Additionally, the separated bottom lead 20 may then be remelted (block 89), similar to the remelting process for the top lead 18 discussed above, to yield metallic lead or a lead alloy suitable for the manufacture of bottom lead components for new lead-acid batteries. Accordingly, as illustrated in FIG. 5, the process 70 enables the efficient recycling of the lead content 12, the polymer content 14, and the sulfuric acid content 16 of the lead-acid battery 10.

Figure 6:
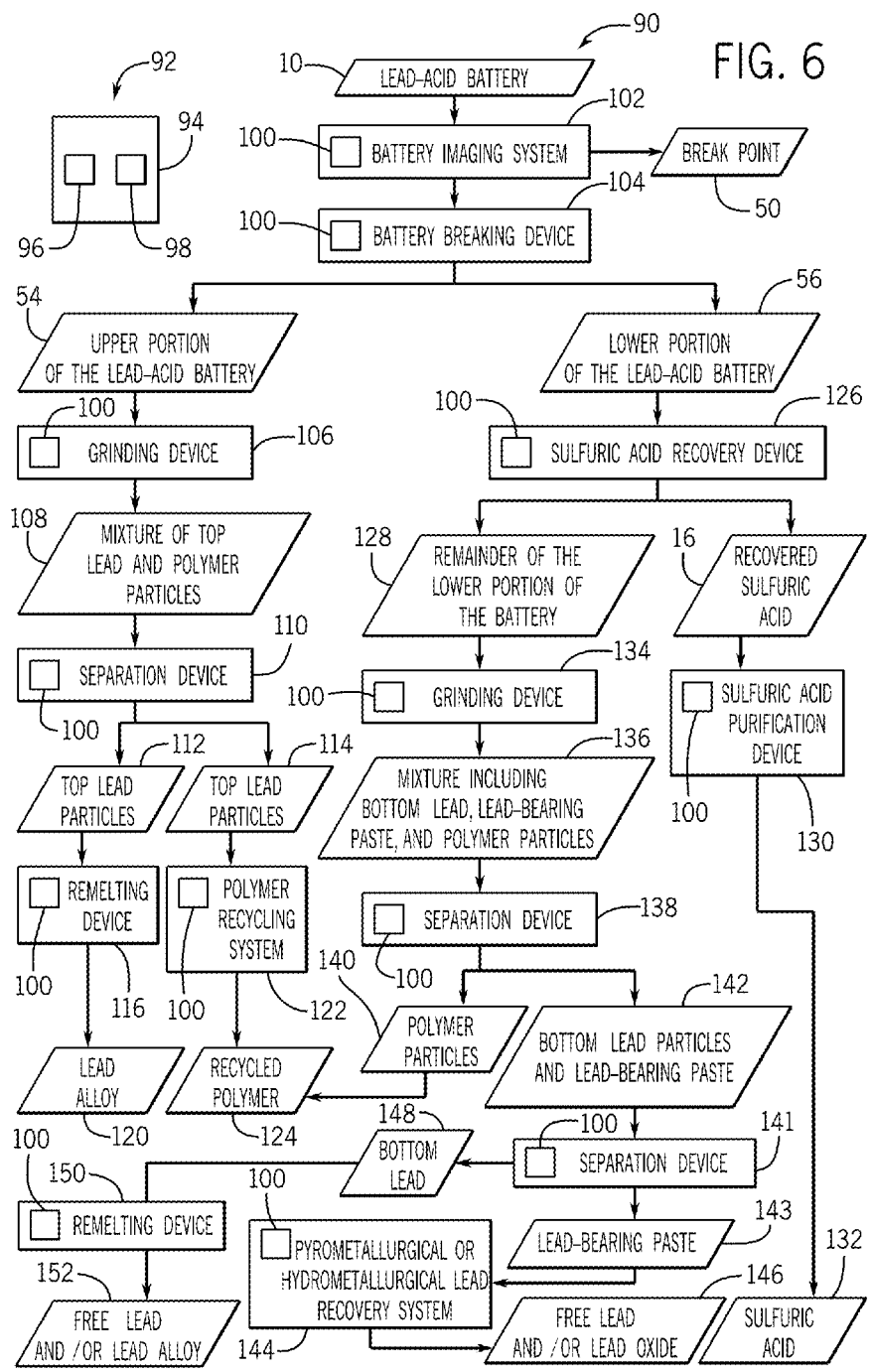
FIG. 6 is a system for recovering lead, polymer, and sulfuric acid content from a spent lead-acid battery, in accordance with embodiments of the present approach.

FIG. 6 illustrates an embodiment of a lead-acid battery processing system 90 configured to process lead-acid batteries 10, in accordance with the process 70 illustrated in FIG. 5, in what may be referred to as a continuous manner. In certain embodiments, some or all of the illustrated system 90 may be implemented as a multi-stage reactor system, or a series of individual reactors to enable the continuous processing of lead-acid batteries 10 (e.g., spent lead-acid batteries) into materials useful in the construction of new lead-acid batteries. In addition to these devices, stages, and/or reactors (illustrated as rectangles) in the system 90, FIG. 6 also illustrates the various inputs and outputs (illustrated as parallelograms) for each device in the system 90. It may be appreciated that, in certain embodiments, the functions provided by multiple devices may be performed by a single device, in accordance with embodiments of the present approach.

The embodiment of the lead-acid battery processing system 90 illustrated in FIG. 6 includes a control system 92 having at least one controller 94 (e.g., a programmable logic controller (PLC)). The controller 94 includes a memory 96 and a processor 98, which enable the controller 94 to store and execute instructions (e.g., applications, modules, apps, firmware) to control operation of the system 90. For examples, the system 90 may include any number of sensing field devices 100 (e.g., temperature sensors, pressure sensors, flow rate sensors, oxygen sensors, rotational speed sensors, pH sensors) that are disposed throughout the system 90 and are communicatively coupled to the controller 94 (e.g., via a wired or wireless communication channel) to enable the controller 94 to determine the operational parameters of the system 90. Further, the controller 94 may be communicatively coupled to one or more control field devices 100 (e.g., actuators, valves, motors, pumps, screws, heating elements, compressors) configured to receive control signals from the controller 94 and to modulate their operation or state accordingly.

With the foregoing in mind, the illustrated lead-acid battery processing system 90 includes a battery imaging system 102 that receives a supply of lead-acid batteries 10, for example, provided by a conveyor belt. As discussed above with respect to FIG. 5, the battery imaging system 102 may perform an optical and/or X-ray imaging and imaging analysis to determine a suitable position for the break point 50. In certain embodiments, the battery imaging system 102 may include a processor that performs the imaging analysis. In other embodiments, battery imaging system 102 may provide imaging data to the processor 98 of the controller 94 to perform the image analysis. Subsequently, the lead-acid battery 10 may proceed to a battery breaking device 104, such as a bandsaw or a guillotine device, which breaks or cuts the lead-acid battery 10 into the upper portion 54 and the lower portion 56, based on control signals received from the controller 94. As mentioned above, in certain embodiments, battery breaking device 104 may also be the sulfuric acid recovery device 126. For such embodiments, the battery breaking device 104 may orient the lead-acid battery 10 such that, upon breaking the lead-acid battery 10 along a vertically oriented break point 50, the sulfuric acid 16 may flow out under gravity to be collected by the battery breaking device 104 at generally the same time as the upper portion 54 and the lower portion 56 of the lead-acid battery 10 are separated.

As discussed above with respect to FIG. 5, for the embodiment illustrated in FIG. 6, the upper portion 54 may be separated from the lower portion 54 and proceed to a grinding device 106, such as a hammer mill, which grinds the upper portion 54 to form a mixture 108 of top lead and polymer particles. This mixture 108 may be provided to a separation device 110, such as a centrifuge separation device or cyclone separator, that separates the top lead particles 112 from the polymer particles 114. The top lead particles 112 may then proceed to a remelting device 116 and may be remelted to form a lead alloy 120 that may be used in the manufacture of top lead 18 or bottom lead 20 components for a new lead-acid battery. The polymer particles 114 may proceed to a polymer recycling system 122, wherein the polymer particles may be processed (e.g., melted, extruded, mixed with other monomers or polymers) to form a recycled polymer 124 that may be used in the manufacture of polymer components (e.g., polymer enclosure) for the construction of a new lead-acid battery.

For the system 90 illustrated in FIG. 6, the lower portion 56 of the lead-acid battery 10 proceeds to a sulfuric acid recovery device 126, which separates the sulfuric acid content 16 from the remainder 128 of the lower portion 56. For example, in certain embodiments, the sulfuric acid recovery device 126 may lean or tip the lower portion 56 such that the liquid sulfuric acid 16 contained within flows into a collection vessel. The recovered sulfuric acid 16 may be provided to a sulfuric acid purification device 130 (e.g., including a selective membrane, filter, or evaporator) which may remove one or more impurities from the recovered sulfuric acid 16 and/or adjust the pH of the recovered sulfuric acid 16 to yield sulfuric acid 130 that is suitable for use in the production of a new lead-acid battery.

For the system 90 illustrated in FIG. 6, the remainder 128 of the lower portion 56 subsequently proceeds to a grinding device 134, such as a hammer mill, capable of grinding the remainder of the lower portion 56 into a mixture 136 that includes particles of bottom lead 20, particles of polymer 14, and lead-bearing paste 22. The mixture 136 may be provided to a separation device 138, such as a sedimentation system, a centrifuge separation device, or cyclone separator, that separates the polymer particles 140 from the mixture 142 of particles of bottom lead 20 and lead-bearing paste 22. The polymer particles 140 may proceed to the polymer recycling system 122, as described above. The mixture 142 of particles of bottom lead 20 and lead-bearing paste 22 may then proceed to another separation device 141 (e.g., a sedimentation system, a centrifuge separation device, or cyclone separator) that separates the lead-bearing paste 143 from the bottom lead 148. The lead-bearing paste 143 may then proceed to a pyrometallurgical or hydrometallurgical lead recovery system 144. In particular, in certain embodiments, the lead recovery system 144 may be (or may include features described in) an embodiment of a hydrometallurgical lead recovery system described in concurrent U.S. patent application Ser. Nos. 14/498,748, 14/498,771, 14/498,798, and 14/498,839. Accordingly, depending on the conditions of the pyrometallurgical or hydrometallurgical recovery technique, the lead mixture 142 may be converted to free lead and/or lead oxide 146 that may be used in the manufacture of grids 24 or lead-bearing paste 22 for the construction of new lead-acid batteries. Additionally, the particles of bottom lead 148 may proceed to the remelting device 150 to be remelted to form free lead and/or lead alloys 150 that may be used in the manufacture of grids 24 for the construction of new lead-acid batteries.

It may be appreciated that, in contrast to batch processing techniques, the present technique involves the individual analysis and processing of each lead acid battery 10. As such, the present technique is more adept at handling specialized processing for certain types of lead acid batteries 10. For example, in certain embodiments, when the battery imaging system 102 determines that a particular lead acid battery 10 is an AGM battery, the controller 94 may instruct the system 90 to process the lead acid battery 10 in a different or specialized manner to address the silica content of the battery 10. Furthermore, since the upper portion 54 and the lower portion 56 of the AGM battery 10 are processed separately, the remelting device 116 is not exposed to the silica content of the AGM lead-acid battery 10.

One or more of the disclosed embodiments, alone or in combination, may provide one or more technical effects useful in the recycling of lead-acid batteries. The technical effects include enabling the selective breaking and separate processing of the resulting pieces of a lead-acid battery. The disclosed systems and methods take advantage of how recyclable content is organized within the battery to improve the efficiency of the recovery process. Present embodiments enable the processing of the top lead separately from the remainder of the lead content of the battery, such that the recovered top lead may be used in the manufacture of a new lead-acid battery after only remelting, wherein the alloying metals (e.g., antimony, arsenic, selenium, calcium, tin, silver, cadmium) are retained. Additionally, present embodiments enable the specialized processing of certain types of lead-acid batteries that are problematic for batch processing techniques. The technical effects and technical problems in the specification are exemplary and are not limiting. It should be noted that the embodiments described in the specification may have other technical effects and can solve other technical problems.

While only certain features and embodiments of the disclosure have been specifically illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lead-acid battery processing system, comprising:
an imaging system configured to perform imaging of a lead-acid battery using penetrating radiation and perform image analysis to determine a break point that divides top lead from a remainder of the lead content of the lead-acid battery, wherein the penetrating radiation comprises X-rays, gamma rays, or beta radiation; and
a battery breaking device configured to break the lead-acid battery at the determined break point and separate the lead-acid battery into a first portion, which includes the top lead, from a second portion, which includes the remainder of the lead content, for separate processing of the first and second portions of the lead-acid battery.

2. The system of claim 1, wherein the top lead comprises terminal posts, bushings, and straps of the lead-acid battery.

3. The system of claim 1, wherein the imaging system is configured to determine the break point such that the break point traverses a plurality of lugs that couple one or more grids to one or more straps of the lead-acid battery.

4. The system of claim 3, wherein the top lead comprises a portion of the plurality of lugs.

5. The system of claim 1, wherein the remainder of the lead content of the lead-acid battery comprises a plurality of grids and lead-bearing paste disposed in the second portion of the lead-acid battery.

6. The system of claim 1, comprising:
a grinding device configured to receive and grind the first portion of the lead-acid battery to yield a mixture comprising top lead particles and polymer particles; and
a separation device configured to separate the top lead particles from the polymer particles.

7. The system of claim 1, comprising a remelting device configured to receive and remelt the top lead to form a lead alloy for use in a new lead-acid battery, wherein the remelt does not remove one or more alloying metals of the top lead.

8. The system of claim 1, wherein the imaging system comprises an X-ray imaging system configured to perform X-ray imaging of the lead-acid battery and to perform X-ray image analysis to determine the break point.

9. The system of claim 1, wherein the imaging system comprises a penetrating radiation source and a penetrating radiation detection system configured to probe an internal structure of the spent battery to determine the break point.

10. The system of claim 9, wherein the penetrating radiation source is an X-ray source, a gamma ray source, or a beta radiation source.

11. The system of claim 1, comprising a pyrometallurgical or hydrometallurgical lead recovery system configured to receive and convert at least a portion of the remainder of the lead content of lead acid battery to metallic lead, lead oxide, or a combination thereof, for use in a new lead-acid battery.

12. The system of claim 1, comprising a polymer recycling system configured to recover a portion of the polymer content of the lead-acid battery and to prepare the recovered portion of the polymer content for use in a new lead-acid battery.

13. The system of claim 1, comprising sulfuric acid recovery and purification devices configured to recover a portion of the sulfuric acid content of the lead-acid battery and to prepare the recovered portion of the sulfuric acid content for use in a new lead-acid battery.

14. A method for selectively breaking and separately processing portions of a lead-acid battery, comprising:
 determining, using a battery imaging system, a break point that divides top lead from a remainder of the lead content of the lead-acid battery, wherein the battery imaging system images the lead-acid battery using X-rays, gamma rays, or beta radiation; and
 breaking the lead-acid battery at the determined break point using a battery breaking device; and
 separating the lead-acid battery into a first portion, which includes the top lead, and a second portion, which includes the remainder of the lead content of the lead-acid battery.

15. The method of claim 14, wherein determining the break point comprises:
 performing an X-ray analysis of the lead acid battery using the battery imaging system; and
 determining, using a processor of the battery imaging system, the break point to be below one or more straps of the lead-acid battery based on the X-ray analysis.

16. The method of claim 14, comprising:
 separating the top lead from a remainder of the first portion of the lead-acid battery;
 remelting, using a remelting device, the top lead to form a lead alloy, wherein remelting does not substantially reduce a concentration of alloying metals in the top lead; and
 using the remelted lead alloy to manufacture a new lead-acid battery.

17. The method of claim 16, comprising constructing a terminal post, a bushing, a strap, or a grid for the new lead-acid battery from the lead alloy.

18. The method of claim 14, comprising separating the remainder of the lead content of the lead-acid battery bottom lead into lead-bearing paste and bottom lead.

19. The method of claim 18, comprising:
 remelting the bottom lead to yield metallic lead or a lead alloy;
 forming grids using the remelted metallic lead or lead alloy; and
 manufacturing a new lead-acid battery using the formed grids.

20. The method of claim 18, comprising pyrometallurgically or hydrometallurgically treating the lead-bearing paste to yield metallic lead, lead oxide, or a combination thereof.

21. The method of claim 20, comprising:
 forming grids or battery paste using the metallic lead and/or lead oxide; and
 manufacturing a new lead-acid battery using the formed grids or battery paste.

22. A lead-acid battery processing system, comprising:
 a controller comprising a memory and a processor configured to execute instructions stored in the memory to control operation of the lead-acid battery processing system;
 an imaging system that images a lead-acid battery using X-rays, gamma rays, or beta radiation and provides the processor with image data, wherein the processor analyzes the image data to determine a break point that divides top lead of the lead-acid battery from a remainder of the lead content of the lead-acid battery;
 a battery breaking device that breaks the lead-acid battery at the break point based on control signals provided by the processor of the control system and separates the lead-acid battery into a first portion, which includes the top lead, from a second portion, which includes the remainder of the lead content of the lead-acid battery;
 a remelting device that receives and remelts the top lead from the first portion based on control signals provided by the processor of the controller, wherein the remelt yields a lead alloy that has similar alloying metal composition as the top lead and is suitable for use in new lead-acid batteries; and
 a pyrometallurgical or hydrometallurgical lead recovery system that receives and converts the remainder of the lead content of lead acid battery to metallic lead, lead oxide, or a combination thereof, suitable for use in new lead-acid batteries.

23. The system of claim 22, comprising a polymer recycling system configured to receive a portion of the polymer content from the first and/or second portions of the lead-acid battery and to prepare the portion of the polymer content for use in new lead-acid batteries.

24. The system of claim 22, comprising a sulfuric acid recovery device configured to recover a portion of the sulfuric acid content from the second portion of the lead-acid battery and to prepare the portion of the sulfuric acid content for use in new lead-acid batteries.

25. The system of claim 22, wherein the top lead comprises most or all of the terminal posts, bushings, and straps of the lead-acid battery.

26. The system of claim 25, wherein the top lead does not include bottom lead grids or lead-bearing paste of the lead-acid battery.

27. The system of claim 26, wherein the top lead comprises metallic lead and alloying metals.

* * * * *

UNITED STATES PATENT AND TRADEMARK OFFICE
CERTIFICATE OF CORRECTION

PATENT NO. : 9,660,306 B2
APPLICATION NO. : 14/586005
DATED : May 23, 2017
INVENTOR(S) : Matthew A. Spence, Patrick M. Curran and Eberhard Meissner It is certified that error appears in the above-identified patent and that said Letters Patent is hereby corrected as shown below:

In the Specification

1. In Column 2, Line 37, delete "DRAWINGS" and insert -- BRIEF DESCRIPTION OF DRAWINGS --, therefor.

2. In Column 2, Line 50, delete "terminal the" and insert -- terminal of the --, therefor.

3. In Column 2, Line 53, delete "terminal the" and insert -- terminal of the --, therefor.

4. In Column 4, Line 55, delete "lugs 30" and insert -- lugs 36 --, therefor.

5. In Column 5, Lines 41-42, delete "strap 32," and insert -- straps 34, --, therefor.

6. In Column 7, Lines 62-63, delete "polymer content 12" and insert -- polymer content 14 --, therefor.

7. In Column 7, Line 66, delete "polymer content 12" and insert -- polymer content 14 --, therefor.

8. In Column 10, Line 22, delete "lower portion 54" and insert -- lower portion 56 --, therefor.

9. In Column 10, Line 51, delete "acid 130" and insert -- acid 132 --, therefor.

Signed and Sealed this
Sixth Day of February, 2018

Joseph Matal
*Performing the Functions and Duties of the
Under Secretary of Commerce for Intellectual Property and
Director of the United States Patent and Trademark Office*